US012599941B2

(12) United States Patent
MacKenzie et al.

(10) Patent No.: US 12,599,941 B2
(45) Date of Patent: Apr. 14, 2026

(54) CLEAN HEAD, SYSTEM AND METHOD FOR USE IN CLEANING A FLUID CONDUIT

(71) Applicant: Paradigm Flow Services Limited, Aberdeenshire (GB)

(72) Inventors: Hugh MacKenzie, Aberdeenshire (GB); Ashley Thomson, Aberdeenshire (GB)

(73) Assignee: Paradigm Flow Services Limited, Aberdeenshire (GB)

( * ) Notice: Subject to any disclaimer, the term of this patent is extended or adjusted under 35 U.S.C. 154(b) by 1040 days.

(21) Appl. No.: 17/270,464

(22) PCT Filed: Aug. 23, 2019

(86) PCT No.: PCT/GB2019/052377
§ 371 (c)(1),
(2) Date: Feb. 23, 2021

(87) PCT Pub. No.: WO2020/039208
PCT Pub. Date: Feb. 7, 2020

(65) Prior Publication Data
US 2021/0339298 A1 Nov. 4, 2021

(30) Foreign Application Priority Data
Aug. 23, 2018 (GB) ..................................... 1813782

(51) Int. Cl.
*B08B 9/055* (2006.01)

(52) U.S. Cl.
CPC .......... *B08B 9/0551* (2013.01); *B08B 9/0558* (2013.01); *B08B 2209/04* (2013.01)

(58) Field of Classification Search
CPC ...... E21B 41/0078; E21B 37/08; E21B 37/00; B08B 9/0325; B08B 9/0551;
(Continued)

(56) References Cited

U.S. PATENT DOCUMENTS 5,474,130 A 12/1995 Davis
6,065,541 A 5/2000 Allen
(Continued)

FOREIGN PATENT DOCUMENTS

GB 2509336 A 2/2014
WO 2015126670 A1 8/2015
WO WO-2017122008 A1 * 7/2017 ............. E21B 34/14

*Primary Examiner* — Douglas Lee
(74) *Attorney, Agent, or Firm* — Dickinson Wright PLLC

(57) ABSTRACT

A cleaning head for a cleaning system for use in cleaning a fluid conduit for transporting hydrocarbons and/or a fluid conduit in a hydrocarbon wellbore, comprises a body defining an outer surface having a cross-section which is configured to match, or be comparable to, a cross-section of an inner surface of the fluid conduit. The body defines a jetting fluid flow path extending from a jetting fluid input port to a jetting fluid output port, and wherein the body defines a bypass fluid flow path extending from a bypass fluid input port to a bypass fluid output port, the bypass fluid flow path being separate from the jetting fluid flow path. The cleaning head comprises a jetting head defining one or more jetting apertures, wherein the jetting head is coupled to the jetting fluid output port so that the one or more jetting apertures are in fluid flow communication with the jetting fluid flow path. The cleaning head comprises a variable aperture valve in the bypass fluid flow path, the variable aperture valve defining a variable aperture which varies in response to a variation in fluid flow rate through the bypass fluid flow path.

13 Claims, 4 Drawing Sheets

SECTIONX-X

(58) Field of Classification Search
CPC . B08B 9/0557; B08B 9/0558; B08B 2209/04; B08B 9/0433; B08B 9/04; B08B 9/043; B08B 9/045; B08B 9/053; B08B 9/055; F16L 2101/12; F16L 55/36; F16L 55/38
See application file for complete search history.

(56) References Cited

U.S. PATENT DOCUMENTS

| | | | | | |
|---|---|---|---|---|---|
| 6,173,771 | B1 * | 1/2001 | Eslinger | F28G 3/163 166/173 |
| 2012/0097192 | A1 * | 4/2012 | Crawford | B08B 9/0557 134/22.12 |
| 2013/0025865 | A1 | 1/2013 | Knobloch, Jr. et al. | |
| 2015/0240985 | A1 * | 8/2015 | Soliman | F16L 55/38 134/8 |
| 2019/0186673 | A1 * | 6/2019 | Martinsen | B65H 75/4402 |

* cited by examiner

CLEAN HEAD, SYSTEM AND METHOD FOR USE IN CLEANING A FLUID CONDUIT

CROSS-REFERENCE TO RELATED APPLICATIONS

The present invention claims priority to PCT International Patent Application Serial No. PCT/GB2019/052377 filed Aug. 23, 2019 entitled "Cleaning Head, System and Method for Use in Cleaning a Fluid Conduit," which claims the benefit of GB Patent Application Serial No. 1813782.8 filed Aug. 23, 2018, the entire disclosures of the applications being considered part of the disclosure of this application and hereby incorporated by reference.

FIELD

The present disclosure relates to a cleaning head for a cleaning system, in particular though not exclusively, for use in cleaning a fluid conduit for transporting hydrocarbons and/or for use in cleaning a fluid conduit in a hydrocarbon wellbore. The present disclosure also relates to a cleaning system and a cleaning method.

BACKGROUND

During hydrocarbon production and transportation operations, it is common for the debris, scale, particulate matter, hydrate or wax to build up on the interiors of fluid conduits, including pipelines, wellbores, risers and umbilicals. Such build-up reduces the effective inner diameter (ID) of the conduit and can reduce fluid flow rate for a given pressure or increase pressure for a given fluid flow rate. Build-up may even produce a blockage in a fluid conduit which may completely prevent fluid flow though the conduit. It is also known that particulate matter may accumulate on the inside of the wellbore during drilling, completion and/or workover of a well. In addition, sand and other particulate matter may be produced from the formation and accumulate inside production tubing, and may partially or completely block fluid flow through the production tubing, decreasing the production rate and the efficiency of the well.

It is known to use coiled tubing intervention methods to provide access to pressurised wellbores in wellbore cleanout operations. Coiled tubing is a long continuous length of metal piping wound on a spool, which is straightened by plastic deformation and inserted into the wellbore. During cleaning, fluid is circulated through the inside of the coiled tubing and back out through the annulus between the coiled tubing and the wellbore. Debris, scale, particulate matter, hydrate or wax in the wellbore is brought to surface by the circulating fluid. When performing this type of wellbore operation, it is necessary to employ procedures and equipment for controlling and retaining pressure in the wellbore system to ensure it is isolated from surface. A typical pressure control system includes a tubing injector that contains a drive mechanism to push and pull the coiled tubing in and out of the hole through a pressure control device. The coiled tubing injector described above is a substantial and heavy piece of equipment, with large footprint and high capital expense. The coiled tubing injector also requires a distance of several metres to be available above the isolation valve to accommodate the injector and the gooseneck. This limits the number of installations where coiled tubing operations can be performed and can make operations more costly. These problems are particularly significant in the case of offshore operations, for example in a floating production storage production and offloading vessel (FPSO) where space is at a premium and cranes are unable to lift the components into place. Even light coiled tubing units which are used onshore are still substantial pieces of equipment which are large in size and weight in the context of offshore operations.

To alleviate the problems associated with coiled tubing injection such as helical lock-up during cleaning operations, coiled tubing thruster systems have been developed which use a thruster pig attached to the distal end of the coiled tubing to impart a pull force on the distal end of the coiled tubing to enable the coiled tubing to be deployed to greater depth. Fluid is pumped down the annulus between the wellbore wall and the coiled tubing to apply pressure against the thruster pig, before the fluid passes out in front of the thruster pig. The fluid is then circulated to surface back through the thruster pig and the coiled tubing along with any debris, scale, particulate matter, hydrate or wax removed by the thruster pig.

Other considerations may limit the applications of coiled tubing. Firstly, blockages and restrictions can occur in narrow bore fluid conduits, which are simply too small to receive coiled tubing. In addition, the coiled tubing injector systems described above rely on the rigidity of the coiled tubing to allow it to be pushed into a hole, rather than relying on gravity only (as is the case in wireline operations). However, this rigidity also has drawbacks that make coiled tubing interventions unsuitable for some applications. For example, it may not be possible to inject coiled tubing into a fluid conduit which has a deviated or convoluted path. In extreme cases, coiled tubing may not be sufficiently flexible to pass through some curved or bent pipeline systems. Even where passage is possible, the frictional resistance between the coiled tubing and the inside wall of the wellbore will limit the depth to which the coiled tubing can be deployed. For the foregoing reasons, known cleaning systems which use coiled tubing are generally unsuitable for applications other than the cleaning of wellbores.

More recently, methods have been developed for use in cleaning a fluid conduit for transporting hydrocarbons which rely upon the use of composite tubing. The composite tubing may include at least one plastic layer and at least one metal layer. The composite tubing may include a plastic inner core (which may be polyamide or polyoxymethylene), a plastic outer layer (which may be a polyamide) and at least one metal layer disposed between the inner core and the outer layer. The outer layer may therefore have a lower coefficient of friction than a metal surface of coiled tubing which may make it easier to deploy the composite tubing through fluid conduits, especially along deviated or highly convoluted paths. The at least one metal layer may be a metal sheath formed from braided wire. The braided wire may be steel wire. The composite tubing is capable of being flexed or bent without plastic deformation of the composite tubing material and/or without imparting significant levels of fatigue.

It is also known to attach thruster pigs to composite tubing to enable the thruster pig to be deployed through deviated or highly convoluted paths and thereby enable a wide range of cleaning operations. In such known composite tubing thruster pig systems, the composite tubing is introduced into a fluid conduit by a tubing injector through a pressure control device and fluid is pumped down the annulus between the wellbore wall and the composite tubing to apply pressure against the thruster pig, before the fluid passes out in front of the thruster pig but the rate of deployment of the thruster pig is controlled by the tubing injector. The fluid is then circulated to surface back through the thruster pig and along the composite tubing along with any debris, scale, particulate matter, hydrate or wax removed by the thruster pig.

However, use of such known thruster pig systems for cleaning a fluid conduit requires fluid to be circulated back through the thruster pig thereby requiring the interruption of fluid flow through the fluid conduit.

During use of known thruster pig systems for cleaning a fluid conduit, it is known to monitor tension in the tubing at the tubing injector, and to use the monitored tension to infer information about conditions in the fluid conduit at the location of the thruster pig. For example, a decrease in tension in the tubing sensed at the tubing injector may indicate that the thruster pig has encountered a restriction or blockage in the fluid conduit which prevents further progression of the thruster pig along the fluid conduit. Conversely, an increase in tension in the tubing sensed at the tubing injector may indicate that a fluid flow path through the thruster pig has become restricted or blocked, for example by debris, scale, particulate matter or the like, and that the thruster pig should be retrieved from the fluid conduit.

During use of known thruster pig systems for cleaning a fluid conduit, it may also be desirable to change the fluid flow rate in the fluid conduit. For example, it may be desirable to increase the fluid flow rate in the fluid conduit for more efficient cleaning as the thruster pig removes debris, scale, particulate matter, hydrate or wax from the fluid conduit. However, changing the fluid flow rate in the fluid conduit may result in a variation in the pull force applied by the thruster pig to the distal end of the tubing resulting in a variation in the tension in the tubing sensed at the tubing injector, which variation in sensed tension may at least partially obfuscate any variation in the tension in the tubing sensed at the tubing injector arising as a consequence of a restriction or blockage in the export pipeline and/or in a fluid flow path through the thruster pig. Thus, when using such known thruster pig systems it may not be possible to distinguish between a variation in the sensed tension in the tubing at the tubing injector arising as a result of a change in a fluid flow rate from a variation in the sensed tension in the tubing at the tubing injector arising as a result of a restriction or blockage in the export pipeline or in a fluid flow path through the thruster pig.

Furthermore, it may be desirable to vary the type, composition, viscosity and/or density of the fluid used to clean a fluid conduit when using such a known thruster pig system. For example, it may be desirable to use a gel sweep for enhanced debris removal. However, using a gel sweep with a known thruster pig may result in a very large spike in differential pressure across the thruster pig as the gel sweep passes through the thruster pig resulting in a sudden increase in tension in the tubing and deformation of the tubing and/or damage to the tubing.

SUMMARY

It should be understood that any of the features of any one of the following aspects or embodiments may apply alone or in any combination in relation to any one or more of the other aspects or embodiments.

According to an aspect or embodiment of the present disclosure there is provided a cleaning head for a cleaning system for use in cleaning a fluid conduit for transporting hydrocarbons and/or a fluid conduit in a hydrocarbon well-bore, the cleaning head comprising:

a body defining an outer surface having a cross-section which is configured to match, or be comparable to, a cross-section of an inner surface of the fluid conduit, wherein the body defines a jetting fluid input port on an input side of the body for connection to tubing, a jetting fluid output port on an output side of the body, and a jetting fluid flow path extending from the jetting fluid input port to the jetting fluid output port, and wherein the body defines a bypass fluid input port on the input side of the body, a bypass fluid output port on the output side of the body, and a bypass fluid flow path extending from the bypass fluid input port to the bypass fluid output port, the bypass fluid flow path being separate from the jetting fluid flow path;

a jetting head defining one or more jetting apertures, wherein the jetting head is coupled to the jetting fluid output port so that the one or more jetting apertures are in fluid flow communication with the jetting fluid flow path; and a variable aperture valve in the bypass fluid flow path, the variable aperture valve defining a variable aperture which varies in response to a variation in fluid flow 5 rate through the bypass fluid flow path.

When the cleaning head is located in a fluid conduit, an input side of the cleaning head may be exposed to fluid in the fluid conduit on the input side of the cleaning head and an output side of the cleaning head may be exposed to fluid in the fluid conduit on the output side of the cleaning head.

It may be advantageous to adjust the flow rate of fluid down the annulus defined between an outer surface of the tubing and an inner surface of the fluid conduit on the input side of the cleaning head during cleaning. For example, during the start of a cleaning run the fluid conduit to be cleaned may be heavily restricted and it may only be possible to pump fluid down the annulus at 2 bpm whilst remaining within the maximum allowable operational pressure (MAOP) of the fluid conduit. However, by the time the cleaning head has been injected halfway along the fluid conduit, it may be possible to pump at 6 bpm without exceeding the MAOP due to the reduced friction of thousands of feet of cleaned fluid conduit above the cleaning head. This may be advantageous in many ways. For example, when cleaning a fluid conduit in the form of an export pipe or export line, the flow rate of fluid such as produced hydrocarbon fluid can be raised sooner thereby providing an immediate increase in revenues even whilst cleaning continues. Increasing the fluid flow rate in the annulus may also increase the fluid flow rate in front of the cleaning head increasing the efficiency with which debris is swept through the fluid conduit away from the cleaning head and reducing the risk that the fluid conduit may become blocked downstream. This may also reduce any requirement for gel sweeps where fluid flow rates are lower. Increasing the fluid flow rate in the annulus may also allow the rate of penetration (ROP) of the cleaning head to be increased due to the increased bypass fluid flow sweeping debris, wax and the like faster downstream away from the cleaning head. This may allow the ROP to be increased, for example doubled, thereby reducing cleaning times without decreasing safety margins.

The variable aperture valve may be configured to regulate or reduce any variations in differential pressure between an input fluid pressure acting on the input side of the cleaning head and an output fluid pressure acting on the output side of the cleaning head, which variations in differential pressure arise as a result of any variations in fluid flow rate in the bypass fluid flow path. This may allow the variable aperture valve to regulate the thrust exerted on the cleaning head arising as a result of any variations in fluid flow rate in the bypass fluid flow path and, therefore, to regulate any variations in tension in the tubing sensed at the tubing injector, which variations in tension arise as a result of any variations in the fluid flow rate in the fluid conduit during deployment of the cleaning head in the fluid conduit. This may make it easier to identify any variations in tension in the tubing sensed at the tubing injector, which variations in tension occur as a result of the cleaning head encountering a restriction, or a blockage, in the fluid conduit, for example due to a build-up of debris, scale, particulate matter, hydrate or wax on the inner surface of the fluid conduit.

Similarly, regulating or reducing any variations in differential pressure arising as a result of any variations in fluid flow rate in the bypass fluid flow path may mean that any variations in sensed tension in the tubing at the tubing injector arising as a result of a fluid flow restriction or a blockage in the bypass fluid flow path may be easier to identify. In particular, any variations in sensed tension in the tubing at the tubing injector arising as a result of any debris, scale, particulate matter or the like in the bypass fluid flow path may be easier to identify. Such a variable aperture valve may also serve to regulate or reduce any variations in differential pressure arising as a result of any variations in the type, viscosity and/or density of the fluid flowing through the bypass fluid flow path. In particular, such a variable aperture valve may also serve to regulate any variations in pressure differential pressure arising as a result of the use of a cleaning gel during a gel sweep for enhanced debris removal. Consequently, use of such a variable aperture valve may serve to reduce the maximum tension in the tubing arising as a result of the use of a cleaning gel during a gel sweep thereby reducing the risk of deformation of the tubing and/or damage to the tubing.

The variable aperture valve may define a variable aperture having a cross-sectional area which increases in response to an increase in fluid flow rate through the variable aperture and decreases in response to a decrease in fluid flow rate through the variable aperture over a range of fluid flow rates. This may serve to reduce any variations in the differential pressure across the cleaning head and therefore reduce variations in the thrust exerted on the cleaning head in the presence of variations in fluid flow rate in the fluid conduit over the range of fluid flow rates.

The variable aperture valve may define a variable aperture having a cross-sectional area which is proportional to the square of the fluid flow rate through the variable aperture over a range of fluid flow rates. The differential pressure across the cleaning head may be proportional to the square of the ratio of the fluid flow rate through the variable aperture to the cross-sectional area of the variable aperture over the range of fluid flow rates.

A variable aperture having a cross-sectional area which is proportional to the square of the fluid flow rate through the variable aperture over the range of fluid flow rates may provide a constant differential pressure across the cleaning head over the range of fluid flow rates and therefore cause a constant thrust to be exerted on the body of the cleaning head. This may allow the flow rate of fluid down the annulus on the input side of the cleaning head to be adjusted without varying the pulling force exerted on the tubing by the cleaning head and, therefore, without making it more difficult to identify or detect a restriction or blockage in the fluid conduit and/or a restriction or blockage in the bypass fluid flow path of the cleaning head during cleaning of the fluid conduit from sensed variations in tension in the tubing.

The variable aperture valve may comprise a moveable valve member, a valve seat and a bias arrangement, wherein the bias arrangement biases the valve member towards the valve seat and wherein fluid flow through the bypass fluid flow path urges the valve member to move away from the valve seat against the bias of the bias arrangement.

The bias arrangement may comprise a resilient member such as a compression spring.

The bypass fluid flow path may be annular.

The jetting fluid flow path may be located radially inwardly of the bypass fluid flow path.

The body may comprise an inner member, wherein the inner member defines the jetting fluid flow path internally thereof.

The body may comprise an outer member arranged around the inner member.

An outer surface of the inner member and an inner surface of the outer member may define at least a part of the bypass fluid flow path therebetween.

The body may comprise a flange. The flange may have a cross-section which matches, or which is comparable to, a cross-section of an inner surface of the fluid conduit.

The body may comprise one or more flanges. Each flange may have a cross-section which matches, or which is comparable to, a cross-section of an inner surface of the fluid conduit.

The body may comprise one or more flange components or flange assemblies. Each flange component or each flange assembly may comprise at least one flange having a cross-section which matches, or which is comparable to, a cross-section of an inner surface of the fluid conduit.

Each flange component or each flange assembly may be mounted on the outer member.

The jetting head may rotatable relative to the body.

The jetting head may be rotatable relative to the body in response to a flow of jetting fluid along the jetting fluid flow path and through the one or more jetting apertures.

According to an aspect or embodiment of the present disclosure there is provided a cleaning system for use in cleaning a fluid conduit for transporting hydrocarbons and/or a fluid conduit in a hydrocarbon wellbore, the cleaning system comprising:

the cleaning head as described above;

a jetting fluid pump;

a length of tubing defining a tubing fluid flow path, wherein one end of the tubing is connected to the jetting fluid input port of the cleaning head such that the tubing fluid flow path is in fluid flow communication with the jetting fluid flow path and the other end of the tubing is connected to the jetting fluid pump;

a tubing injector apparatus for injecting the tubing into, and/or retracted the tubing from, the fluid conduit; and a pressure control arrangement for containing pressure within the fluid conduit, wherein the pressure control arrangement is configured to provide a seal with an outer surface of the tubing whilst permitting the tubing to be injected into, and/or retracted from, the fluid conduit.

The cleaning system may comprise a tension sensor for sensing tension in the tubing.

The tension sensor may be provided with, or as part of, the tubing injector apparatus.

The tubing may comprise composite tubing.

The composite tubing may comprise a polymer or a plastic material.

The composite tubing may comprise one or more reinforcement elements.

Each reinforcement element may comprise at least one of Kevlar, glass fibre, carbon fibre and a metal.

The one or more reinforcement elements may be provided in a reinforcement layer.

The one or more reinforcement elements may be embedded in a matrix.

The matrix may comprise a polymer or a plastic material.

The tubing may comprise an outer plastic layer or sleeve.

The outer plastic layer or sleeve may comprise polyamide or HDPE.

According to an aspect or embodiment of the present disclosure there is provided a cleaning method for use in cleaning a fluid conduit for transporting hydrocarbons and/or a fluid conduit in a hydrocarbon wellbore, the cleaning method comprising:

- connecting the jetting fluid input port of the cleaning head as described above to one end of a length of tubing so that the jetting fluid flow path of the cleaning head is in fluid flow communication with a tubing fluid flow path of the tubing;
- deploying the cleaning head into the fluid conduit; and
- pumping bypass fluid along an annulus defined between an outer surface of the tubing and an inner surface of the fluid conduit on an input side of the cleaning head and through the bypass fluid flow path and the variable aperture valve to an output side of the cleaning head to thereby provide a thrust on the cleaning head; and
- pumping jetting fluid through the tubing fluid flow path, the jetting fluid flow path and out of the one or more jetting apertures into the fluid conduit on the output side of the cleaning head.

The method may comprise controlling a rate at which the tubing is injected into, and/or retracted from, the fluid conduit. For example, the method may comprise controlling a rate at which the tubing is injected into, and/or retracted from, the fluid conduit whilst pumping the bypass fluid along the annulus and through the bypass fluid flow path and the variable aperture valve. A combination of the controlled or constant thrust on the cleaning head and the controlled rate of injection of the tubing into the fluid conduit may provide a very controlled rate of penetration of the tubing and the cleaning head into the fluid conduit. This may enhance the efficiency with which the scale, debris, accumulated matter wax and/or hydrates are removed from the interior of the fluid conduit as the cleaning head progresses along the fluid conduit.

The method may comprise pumping the jetting fluid through the tubing fluid flow path, the jetting fluid flow path and out of the one or more jetting apertures into the fluid conduit on an output side of the cleaning head whilst pumping the bypass fluid along the annulus through the bypass fluid flow path and the variable aperture valve and/or whilst controlling a rate at which the tubing is injected into, and/or retracted from, the fluid conduit. This may enhance the efficiency with which the scale, debris, accumulated matter wax and/or hydrates are removed from the interior of the fluid conduit by jets of the jetting fluid exiting the one or more jetting apertures.

The method may comprise sensing or monitoring tension in the tubing.

The method may comprise sensing or monitoring tension in the tubing at, or near, a tubing injector for injecting the tubing into, and/or retracting the tubing from, the fluid conduit.

Such a method may allow a user or operator to more easily identify or detect a restriction or blockage in the fluid conduit and/or a restriction or blockage in the bypass fluid flow path of the cleaning head during cleaning of the fluid conduit from sensed variations in tension in the tubing even in the presence of variations in fluid flow rates.

The method may comprise varying, in response to a sensed change in tension in the tubing, at least one of:

- a rate of pumping of the bypass fluid along the annulus;
- a pressure of the bypass fluid in the annulus;
- a change in at least one of a type, composition, density and viscosity of the bypass fluid;
- a rate of pumping of a jetting fluid along the tubing;
- a pressure of the jetting fluid in the tubing;
- a change in at least one of a type, composition, density and viscosity of the jetting fluid;
- a rate of injection of the tubing into the fluid conduit; and
- a rate of retraction of the tubing from the fluid conduit.

The method may comprise pumping bypass fluid along the annulus through the bypass fluid flow path and the variable aperture valve to provide a thrust on of the body of the cleaning head of up to 5,000 kg, up to 2,000 kg, up to 1,000 kg or up to 400 kg.

The method may comprise pumping bypass fluid along the annulus through the bypass fluid flow path and the variable aperture valve to provide a pressure differential across the cleaning head of less than 6.9 bar (approximately 100 psi), of less than 3.5 bar (approximately 50 psi) or of less than 2.1 bar (approximately 30 psi).

The method may comprise pumping the bypass fluid along the annulus through the bypass fluid flow path and the variable aperture valve at a rate of up to 5,000 litres per minute, at a rate of up to 2,000 litres per minute, at a rate of up to 1,000 litres per minute or at a rate of up to 150 litres per minute. Such high bypass fluid flow rates may mean that any scale, debris, accumulated matter, wax and/or hydrates removed from the interior of the fluid conduit by the cleaning head are efficiently swept away by the bypass fluid flow from an output side of the cleaning head towards an exit of the fluid conduit.

The bypass fluid may comprise existing fluid present in the fluid conduit before the cleaning head is deployed into the fluid conduit.

The bypass fluid may comprise at least one of fluid produced from one or more wellbores, hydrocarbon fluid, water, brine, and a cleaning fluid or gel.

The method may comprise pumping the jetting fluid into the tubing at a rate of up to 500 litres per minute, at a rate of up to 200 litres per minute, at a rate of up to 100 litres per minute or at a rate of up to 80 litres per minute.

The method may comprise varying the pressure at which the jetting fluid is pumped into the tubing according to the length of tubing between a jetting fluid pump and the cleaning head.

The method may comprise increasing the pressure at which the jetting fluid is pumped into the tubing as the length of tubing between the jetting fluid pump and the cleaning head increases.

The method may comprise pumping the jetting fluid into the tubing at a pressure of up to 690 bar (approximately 10,000 psi). The use of such jetting fluid pressures may provide one or more high pressure jets of jetting fluid for efficiently stripping scale, debris, accumulated matter wax and/or hydrates from the interior of the fluid conduit on an output side of the cleaning head.

The jetting fluid may comprise existing fluid present in the fluid conduit before the cleaning head is deployed into the fluid conduit.

The jetting fluid may comprise at least one of fluid produced from one or more wellbores, hydrocarbon fluid, water, brine, and a cleaning fluid.

The method may comprise rotating the jetting head relative to the body. For example, the cleaning head may be configured so that pumping the jetting fluid along the jetting fluid flow path and out of the one or more jetting apertures may cause the jetting head to rotate relative to the body resulting in rotating jets of fluid which may strip scale, debris, accumulated matter wax and/or hydrates from the interior of the fluid conduit on the output side of the cleaning head. The combination of the use of such rotating high pressure fluid jets with the very controlled rate of penetration of the cleaning head into the fluid conduit may enhance the efficiency with which the high pressure fluid jets strip scale, debris, accumulated matter wax and/or hydrates from the interior of the fluid conduit. In addition, the high flow rate bypass fluid flow may sweep the stripped scale, debris, accumulated matter wax and/or hydrates away towards an exit of the fluid conduit.

The method may comprise retrieving the cleaning head from the fluid conduit

Retrieving the cleaning head from the fluid conduit may comprise ceasing pumping of the bypass fluid along the annulus through the bypass fluid flow path and the variable aperture valve.

Retrieving the cleaning head from the fluid conduit may comprise ceasing pumping the jetting fluid through the tubing fluid flow path, the jetting fluid flow path and out of the one or more jetting apertures into the fluid conduit on the output side of the cleaning head.

Retrieving the cleaning head from the fluid conduit may comprise sealing the fluid conduit on the output side of the cleaning head.

Retrieving the cleaning head from the fluid conduit may comprise retracting the tubing from the fluid conduit.

Retrieving the cleaning head from the fluid conduit may comprise retracting the tubing from the fluid conduit until the cleaning head becomes hydraulically locked within the fluid conduit.

Retrieving the cleaning head from the fluid conduit may comprise pumping fluid through the tubing fluid flow path, the jetting fluid flow path and out of the one or more jetting apertures into the fluid conduit on the output side of the cleaning head to provide a thrust on the cleaning head. This may cause an increase in pressure on the output side of the cleaning head against the valve or seal used to seal the fluid conduit thereby creating a thrust on the cleaning head which may assist the retrieval of the cleaning head from the fluid conduit.

Retrieving the cleaning head from the fluid conduit may comprise further retracting the tubing from the fluid conduit.

Retrieving the cleaning head from the fluid conduit may comprise pumping water or brine into the annulus.

The tubing may comprise composite tubing.

The composite tubing may comprise a polymer or a plastic material.

The composite tubing may comprise one or more reinforcement elements.

Each reinforcement element may comprise at least one of Kevlar, glass fibre, carbon fibre and a metal.

The one or more reinforcement elements may be provided in a reinforcement layer.

The one or more reinforcement elements may be embedded in a matrix.

The matrix may comprise a polymer or a plastic material.

The tubing may comprise an outer plastic layer or sleeve.

The outer plastic layer or sleeve may comprise polyamide or HDPE.

BRIEF DESCRIPTION OF THE DRAWINGS

Cleaning heads, cleaning systems and cleaning methods for use in cleaning a fluid conduit for transporting hydrocarbons and/or a fluid conduit in a hydrocarbon wellbore are described herein by way of non-limiting example only with reference to the following drawings of which.

DETAILED DESCRIPTION OF THE DRAWINGS

One of skill in the art will understand that one or more of the features of the embodiments described below with reference to the drawings may produce effects or provide advantages when used in isolation from one or more of the other features of the embodiments and that different combinations of the features are possible other than the specific combinations of the features of the embodiments described below.

Figure 1:
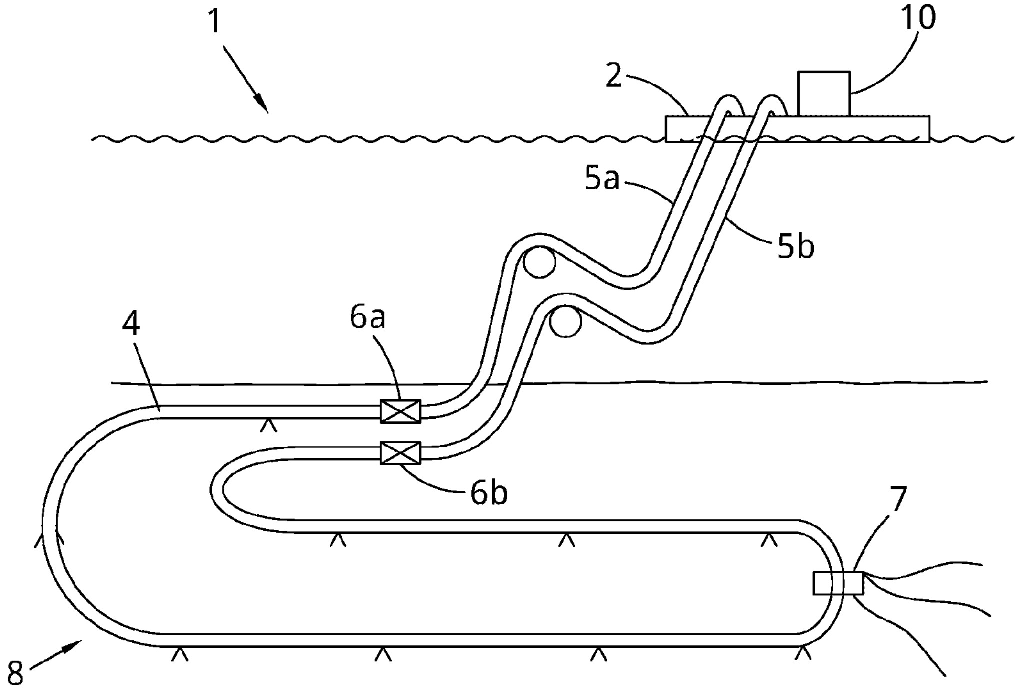
FIG. 1 is a schematic of a subsea hydrocarbon production installation and a cleaning apparatus for cleaning a fluid conduit system of the subsea hydrocarbon production installation.

Referring initially to FIG. 1, there is shown a subsea hydrocarbon production installation, generally designated 1, which includes a Floating Production Storage and Offloading (FPSO) vessel 2 coupled to a subsea pipeline 4 via a pair of flexible risers 5*a*, 5*b*. The flexible risers 5*a*, 5*b* are coupled to the subsea pipeline 4 via Subsea Isolation Valves (SSIVs) 6*a*, 6*b*. The risers 5*a*, 5*b* and the subsea pipeline 4 define a pigging loop, generally designated 8, which may be several kilometres in length. The subsea pipeline 4 is tied in to several subsea wells via manifolds 7. Also shown in FIG. 1 is a cleaning apparatus 10 located on the FPSO vessel 2 for a cleaning system for use in cleaning the flexible risers 5*a*, 5*b* and/or the subsea pipeline 4.

Figure 2:
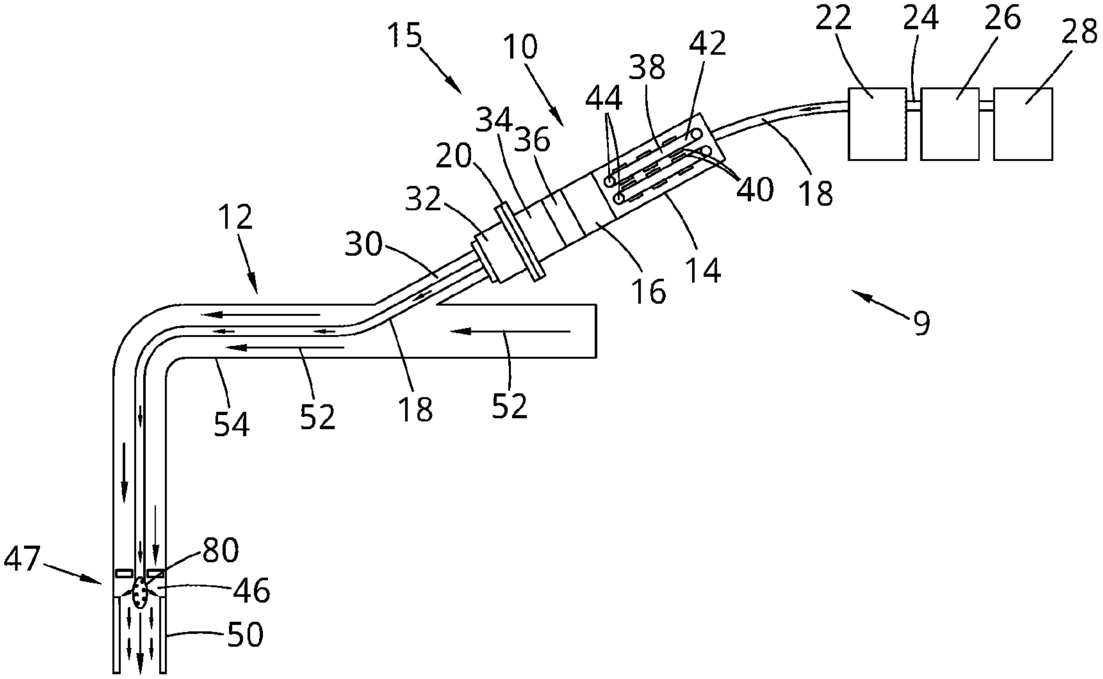
FIG. 2 is a schematic of a cleaning system for cleaning a fluid conduit system such as the fluid conduit system of the subsea hydrocarbon production installation of FIG. 1.

FIG. 2 shows a cleaning system, generally designated 9, including the cleaning apparatus generally designated 10, tubing in the form of composite tubing 18, and a cleaning head generally designated 47 coupled to a distal end of the composite tubing 18. In FIG. 2, the cleaning apparatus 10 is shown coupled to a fluid conduit 54. The fluid conduit 54 may be configured for transporting hydrocarbons and/or may be located in a hydrocarbon wellbore. The fluid conduit 54 may form part of a fluid conduit system 12. For example, the fluid conduit 54 may be one of the risers 5*a*, 5*b* or the subsea pipeline 4 of the hydrocarbon production installation 1 of FIG. 1. Additionally or alternatively, the fluid conduit 54 may be an export pipe or an export line.

The cleaning apparatus 10 comprises a tubing injector generally designated 14, and a pressure control assembly, generally designated 15. The pressure control assembly 15 comprises a valve arrangement 16, a stripper 36, and a housing 34. The cleaning apparatus 10 defines an internal bore (not shown), for receiving the composite tubing 18. The cleaning system 2 includes a tubing storage reel 22 for storing the composite tubing 18, a jetting pump 26, and a tank 28. The tubing storage reel 22 may store several tens or indeed many hundreds of metres of the composite tubing 18. A proximal end 24 of the composite tubing 18 is connected to the jetting pump 26, which pumps cleaning fluid from the tank 28.

The composite tubing 18 is selected to have sufficient flexibility to allow it to pass through a wide range of conduit systems. However, the composite tubing must also be robust enough to withstand forces experienced in normal use and have a pressure rating sufficient for use in a high pressure jetting system, which may for example operate at between 10 kpsi (or 69,000 KPa) and 20 kpsi (or 138,000 KPa). The composite tubing 18 must also have sufficient crush resistance to allow it to be passed through the stripper 36. The composite tubing 18 comprises a plastic inner core formed from polyamide surrounded by a number of braided steel wire layers. An outer plastic layer of polyamide surrounds the braided wire layers. The braided layers function to provide crush resistance from the forces experienced by the stripper 36 and/or the tubing injector 14, and the inner plastic core in conjunction with the braided layers provides the composite tubing with high pressure capability. The outer plastic layer provides the composite tubing 18 with the smoothness required to mitigate frictional forces experienced as the composite tubing is run into the fluid conduit. One example of suitable composite tubing is the 2240N-16V30 ultra high pressure hose marketed by Hydrasun Ltd. This composite tubing 18 has an outer diameter of 37 mm, an inner diameter of 25 mm, and a minimum bend radius to 300 mm, which is a good combination of pressure handling, flow volume, stiffness and flexibility, and crush resistance for the applications envisaged. It will be appreciated that other composite tubing may be used.

The cleaning apparatus 10 comprises a coupling 20 for connecting the cleaning apparatus 10 to an opening of the fluid conduit system 12. In this case, the opening is defined by a side branch 30 to the fluid conduit 54. The side branch 30 is located at an acute angle to a straight section of the fluid conduit 54, although other embodiments may have openings at different locations along the fluid conduit 54 and with different orientations. An isolation valve 32 is located at the opening of the side branch 30, to retain fluid pressure within the fluid conduit system 12. The cleaning apparatus 10 couples to the fluid conduit system 12 above the isolation valve 32. The side branch 30 is just one example of a suitable inlet to the fluid conduit system 12.

Conveniently, the side branch 30 may be fitted to the fluid conduit system 12 during a shutdown period. Such shutdown periods occur at intervals (for example for conventional maintenance purposes), and the side branch 30 or another inlet type may be fitted to the fluid conduit system 12 during this time. The isolation valve 32 will be closed before the flow is re-introduced to the fluid conduit 54.

The valve arrangement 16 comprises a blowout preventer (not shown) which provides an additional safety mechanism. The blowout preventer 16 is a shear and seal blowout preventer, which has the capability to cut or otherwise sever a cleaning flowline introduced to the fluid conduit system 12 via the cleaning apparatus 10. This embodiment also comprises a chamber 34 which functions as a lubricator, providing an access chamber for coupling the cleaning head 47 to the distal end of the composite tubing 18.

Optionally a divertor (not shown) may be provided to create a fluid outlet for fluid in the annulus between the introduced composite tubing 18 and the inner surface of the side branch 30 to the fluid conduit system 12.

The stripper 36 comprises internal pack off elements (not shown) which define a portion of the internal bore through the cleaning apparatus 10. The pack-off elements are formed from an elastomeric material, arranged to provide a fluid seal with the outer surface of the composite tubing 18 as it passes through the cleaning apparatus 10. The pack-off elements are operable to be actuated against the outer surface of the composite tubing 18, and in this case are actuated by introducing hydraulic pressure into a chamber outside of the pack off elements. In other embodiments, the pack off elements may be mechanically actuated. The stripper 36 allows the composite tubing 18 to pass through the cleaning apparatus 10 while retaining pressure in the fluid conduit system 12 below the stripper 36.

The tubing injector 14 comprises a drive arrangement in the form of a drive mechanism 38 for pushing and pulling the composite tubing 18 into and out of the fluid conduit system 12 through the pressure control assembly 15. The drive mechanism 38 comprises an arrangement of gripping members 40, with the gripping members 40 mounted on corresponding chains 42 driven by corresponding cogs 44. The tubing injector 14 further includes a tension sensor (not shown explicitly) for sensing a tension in the composite tubing 18 at the tubing injector 14.

Figure 3A:
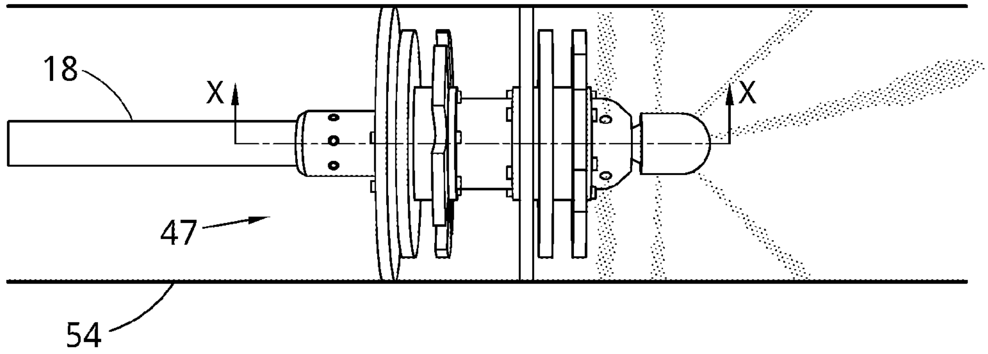
FIG. 3A shows a cleaning head of the cleaning system of FIG. 2.
Figure 3B:
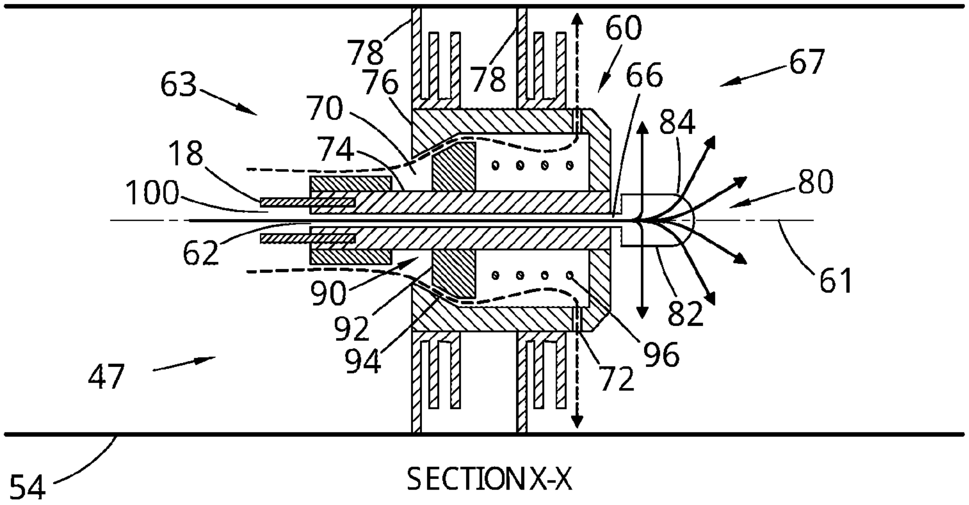
FIG. 3B shows a cross-section on X-X of the cleaning head of FIG. 3A.

FIGS. 3A and 3B show the cleaning head 47 in more detail located within the fluid conduit 54 to be cleaned. The cleaning head 47 takes the form of a jetting pig which includes a body generally designated 60, a jetting head generally designated 80, and a variable aperture valve generally designated 90. The cleaning head 47 defines an axis 61 which, in use, is aligned with an axis of the fluid conduit 54.

The body 60 has a radially outer surface having a cross-section which matches, or which is comparable to, a cross-section of a radially inner surface of the fluid conduit 54 to be cleaned. Specifically, the body 60 comprises a pair of flanges 78, wherein each flange 78 has a radially outer surface having a cross-section which matches, or which is comparable to, a cross-section of an inner surface of the fluid conduit 54. The body 60 defines an input side 63 which includes a surface which is exposed to fluid in the fluid conduit 54 on one side of the flanges 78 and an output side 67 which includes a surface which is exposed to fluid in the fluid conduit 54 on the other side of the flanges 78.

The body 60 defines a jetting fluid input port 62 on the input side 63 of the body 60 for connection to the composite tubing 18, a jetting fluid output port 66 on the output side 67 of the body 60, and a jetting fluid flow path from the jetting fluid input port 62 to the jetting fluid output port 66. The body 60 further defines an annular bypass fluid input port 70 on the input side 63 of the body 60, a plurality of bypass fluid output ports 72 on the output side 67 of the body 60 and a bypass fluid flow path from the annular bypass fluid input port 70 to the plurality of bypass fluid output ports 72. The bypass fluid flow path is separate from the jetting fluid flow path.

As may be appreciated from FIG. 3B, the bypass fluid flow path is generally annular and the jetting fluid flow path is located radially inwardly of the bypass fluid flow path. Specifically, the body 60 includes an inner member 74, wherein the inner member 74 defines the jetting fluid flow path internally thereof. The body 60 further includes an outer member 76 arranged around the inner member 74. An outer surface of the inner member 74 and an inner surface of the outer member 76 define the bypass fluid flow path therebetween. Each of the flanges 78 is mounted on the outer member 76.

The jetting head 80 includes a body 82 defining one or more jetting apertures 84. The body 82 of the jetting head 80 is coupled to the jetting fluid output port 66 so that the one or more jetting apertures 84 are in fluid flow communication with the jetting fluid flow path. In use, the jetting head 80 is rotatable relative to the body 60 as a consequence of a flow of fluid through the jetting fluid flow path and out of the one or more jetting apertures 84.

The variable aperture valve 90 defines a variable aperture which varies in response to a variation in fluid flow rate through the bypass fluid flow path. The variable aperture valve 90 includes a generally moveable annular valve member 92, a valve seat 94, and a bias arrangement in the form of a compression spring 96. As may be appreciated from FIG. 3, the valve seat 94 is defined by an inner surface of outer member 76. The compression spring 96 biases the valve member 92 towards the valve seat 94.

In use, the variable aperture valve 90 regulates or reduces variations in a differential pressure between an input fluid pressure acting on an input side of the cleaning head 47 and an output fluid pressure acting on an output side of the cleaning head 47, which variations in differential pressure arise as a result of any variations in fluid flow rate in the bypass fluid flow path. Regulating or reducing variations in the pressure differential in this way regulates or reduces variations in the thrust exerted on the cleaning head 47 arising as a result of the variations in the fluid flow rate in the fluid conduit 54 and, therefore, regulates or reduces variations in the tension in the composite tubing 18 sensed at the tubing injector 14, which variations in tension arises as a result of the variations in the fluid flow rate in the fluid conduit 54. This may make it easier to identify any variations in the tension in the composite tubing 18 sensed at the tubing injector 14 occurring as a result of the cleaning head 47 encountering a restriction, or a blockage, in the fluid conduit 54, for example due to a build-up of debris, scale, particulate matter, hydrate or wax on the inner surface of the fluid conduit 54.

Similarly, regulating or reducing any variations in differential pressure across the cleaning head 47, which variations in differential pressure arise as a result of any variations in fluid flow rate in the bypass fluid flow path, may mean that any variations in the tension in the composite tubing 18 sensed at the tubing injector 14 resulting from a fluid flow restriction or a blockage in the bypass fluid flow path may be easier to identify. In particular, any variations in tension in the composite tubing 18 sensed at the tubing injector 14 resulting from the presence of any debris, scale, particulate matter or the like in the bypass fluid flow path may be easier to identify.

Such a variable aperture valve 90 may also serve to regulate or reduce any variations in differential pressure across the cleaning head 47 arising a result of any variations in the type, viscosity and/or density of the fluid flowing through the bypass fluid flow path. In particular, such a variable aperture valve 90 may also serve to regulate or reduce any variations in differential pressure arising as a result of the use of a cleaning gel during a gel sweep for enhanced debris removal. Consequently, use of such a variable aperture valve 90 may serve to reduce the maximum tension in the composite tubing 18 arising as a result of the use of a cleaning gel during a gel sweep thereby reducing the risk of deformation of the composite tubing 18 and/or damage to the composite tubing 18.

Specifically, the variable aperture valve 90 defines a variable aperture between the valve member 92 and the valve seat 94, which variable aperture has a cross-sectional area which increases in response to an increase in fluid flow rate through the variable aperture and decreases in response to a decrease in fluid flow rate through the variable aperture over a range of fluid flow rates. More specifically, the variable aperture valve 90 defines a variable aperture having a cross-sectional area which is proportional to the square of the fluid flow rate through the variable aperture over a range of fluid flow rates. The differential pressure across the cleaning head 47 is generally proportional to the square of the ratio of the fluid flow rate through the variable aperture to the cross-sectional area of the variable aperture over the range of fluid flow rates. Thus, a variable aperture having a cross-sectional area which is proportional to the square of the fluid flow rate through the variable aperture over the range of fluid flow rates may provide a constant differential pressure across the cleaning head 47 over the range of fluid flow rates and may, therefore, apply a constant pull force to the distal end of the composite tubing 18.

A cleaning method will now be described for use in cleaning the fluid conduit 54. The tubing injector 14 must be capable of pushing in the composite tubing 18 against the resistance of fluid pressure in the fluid conduit system 8, frictional contact between the composite tubing 18 and the inside surface of the fluid conduit system 12, as well as the resistance presented by the pressure control assembly 15. The tubing injector 14 must additionally be capable of withdrawing the composite tubing 18 from the fluid conduit system 12 against the weight of the length of composite tubing 18 which has been deployed. In this embodiment, the tubing injector 14 is capable of applying a pushing and/or pulling force equivalent to around 9,071 kg (approximately 20,000 lbs) of weight. Tubing injectors with other push/pull capacities may be used in other embodiments, although increasing the power of the tubing injector 14 tends to increase the size and weight of the equipment, and therefore an appropriate compromise between power and size is necessary. The tubing injector 14 is also equipped to carry out "pull tests" during deployment of the composite tubing 18. At regular intervals during deployment of the composite tubing 18, pumping of fluid through the composite tubing 18 is interrupted. The tubing injector 14 pulls back on the composite tubing 18 by reversing the direction of the drive mechanism and measures the force required to withdraw the composite tubing 18 a short length from the fluid conduit system 8. If the force required exceeds a preset threshold (which approaches the maximum pull force achievable by the tubing injector 14) then a warning may be provided to an operator to indicate that the composite tubing 18 is approaching its maximum deployment length, and or that there is a possibility that the composite tubing 18 is becoming stuck.

In use, the cleaning apparatus 10 is assembled by inserting the composite tubing 18 into the tubing injector 14 and feeding the composite tubing 18 through the stripper 36 before the pack off elements within the stripper 36 are actuated. When a distal end 46 of the hose has been passed through the pressure control equipment 15, the cleaning head 47 can be fitted to the end 46 of the composite tubing 18 in the access chamber 34. Specifically, the composite tubing 18 is connected to the jetting fluid input port 62 of the cleaning head 47 so that the jetting fluid flow path of the cleaning head 47 is in fluid flow communication with a tubing fluid flow path 100 of the composite tubing 18, the cleaning head 47 is deployed into the fluid conduit 54 to be cleaned.

The cleaning head 47 is not capable of being passed through the stripper 36. The cleaning head 47 is however able to pass through the bore defined by the chamber 34, coupling 20 and isolation valve 32. The cleaning head 47 can therefore be attached to the composite tubing 18 beneath the blow out preventer 16 and the stripper 36 and can subsequently be withdrawn into the chamber 34 before the apparatus 10 is attached to the fluid conduit system 12. With the cleaning head 47 in the chamber 34, the stripper 36 is actuated to pack off around the composite tubing 18. With the composite tubing 18 fed through and sealed by the stripper 36, the cleaning apparatus 10 is coupled to the fluid conduit system 12 by the coupling 20. The isolation valve 32 is opened to expose the composite tubing 18 and the bore defined by the lower parts of the cleaning apparatus 10 to the pressure of the fluid conduit system 12. The cleaning apparatus 10 allows the composite tubing 18 to be introduced into the fluid conduit system 12 while produced hydrocarbon fluid is flowing in the fluid conduit system 12. The composite tubing 18 is then deployed by injecting the composite tubing 18 through the stripper 36 and further into the fluid conduit system 12.

Figure 4A:
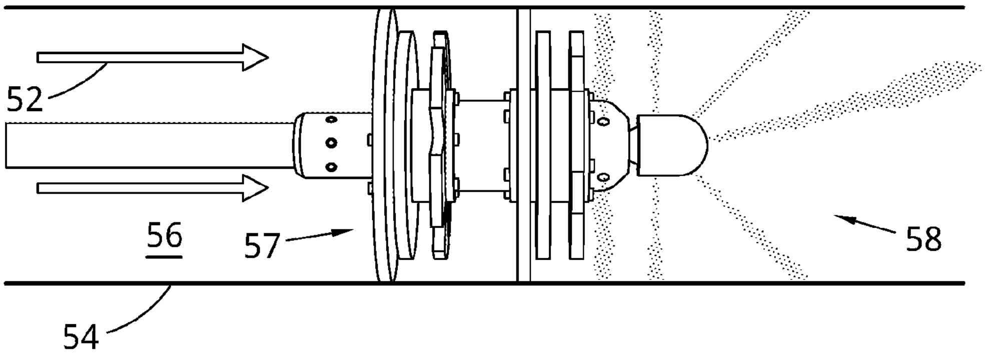
FIG. 4A illustrates a method of deploying the cleaning head of FIG. 3A into a fluid conduit system.

As will be described in more detail below, the flow of fluid in the fluid conduit system 12 imparts a thrust on the cleaning head 47 and assists with the deployment of the composite tubing 18 into the fluid conduit system 12. The thrust provides or maintains a degree of tension in the composite tubing 18 sufficient to prevent lock-up of the composite tubing 18 during deployment. Specifically, as shown in FIG. 4A, bypass fluid 52 is pumped along an annulus 56 defined between an outer surface of the composite tubing 18 and an inner surface of the fluid conduit 54 on an input side 57 of the cleaning head 47, and through the bypass fluid flow path and the variable aperture valve 90 to provide a regulated thrust on the input side 57 of the cleaning head 47. Typically, the bypass fluid is pumped along the annulus 56 and through the bypass fluid flow path and the variable aperture valve 90 at a rate of approximately 1,160 litres per minute to provide a pressure differential of approximately 2.1 bar (30 psi) and a thrust on the cleaning head 47 of approximately 1,500 kg. The bypass fluid may comprise at least one of: fluid produced from one or more wellbores, hydrocarbon fluid, water, brine, and a cleaning fluid or gel. One of ordinary skill in the art will understand that, if the bypass fluid is the same fluid which is normally present in the fluid conduit 54, or which normally flows or is transported through the fluid conduit 54, the same fluid may continue to flow through the fluid conduit 54 whilst cleaning is performed.

Once the bypass fluid flow rate has reached a steady value and the thrust on the cleaning head 47 has reached approximately 1,500 kg, the tubing injector 14 is used to control the rate at which the composite tubing 18 is injected into the fluid conduit 54 whilst pumping of the bypass fluid 52 continues along the annulus 56 and through the bypass fluid flow path and the variable aperture valve 90. A combination of the thrust on the cleaning head 47 and the use of the tubing injector 14 to inject the composite tubing 18 into the fluid conduit 54, may provide a very controlled rate of penetration of the composite tubing 18 and the cleaning head 47 into the fluid conduit 54. This may enhance the efficiency with which the cleaning head 47 removes scale, debris, accumulated matter wax and/or hydrates 50 from the interior of the fluid conduit system 12. For example, this may enhance the efficiency with which the flanges 78 scrape scale, debris, accumulated matter wax and/or hydrates 50 from the interior of the fluid conduit system 12 and/or the efficiency with which high pressure jets of jetting fluid strip scale, debris, accumulated matter wax and/or hydrates 50 from the interior of the fluid conduit system 12.

Figure 4B:
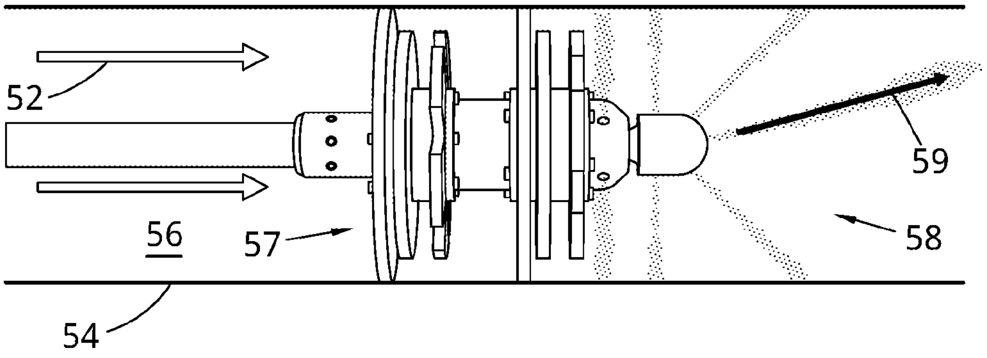
FIG. 4B illustrates a cleaning method using the cleaning head of FIG. 3A to remove scale, debris, accumulated matter wax and/or hydrates from a fluid conduit system.
Figure 4C:
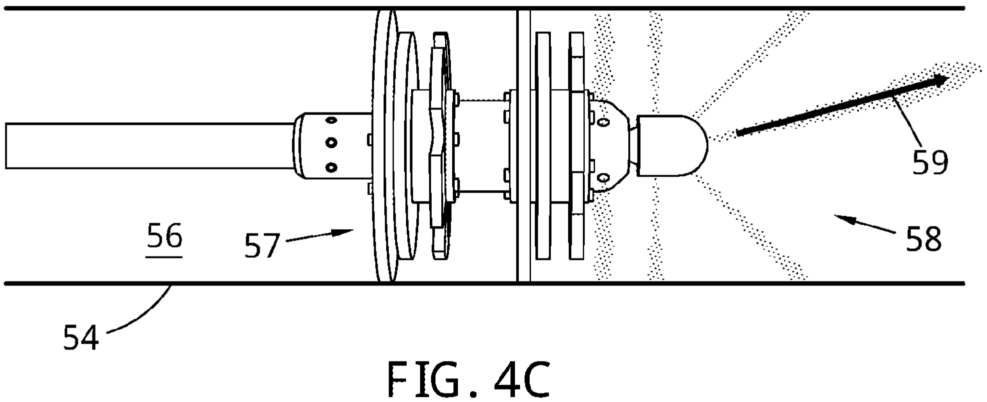
FIG. 4C illustrates a method of retrieving the cleaning head of FIG. 3A from a fluid conduit system.

To initiate jetting, the jetting pump 26 pumps jetting fluid 59 through the tubing fluid flow path 100, the jetting fluid flow path and out of the one or more jetting apertures 84 into the fluid conduit 54 on an output side 58 of the cleaning head 47 as shown in FIG. 4B. The jetting fluid 59 is typically pumped at a rate of approximately 160 litres per minute at a pressure of approximately 340 bar (approximately 4,931 psi). The jetting fluid 59 may comprise existing fluid present in the fluid conduit 54 before the cleaning head 47 is deployed into the fluid conduit 54. The jetting fluid 59 may comprise at least one of fluid produced from one or more wellbores, hydrocarbon fluid, water, brine, or a cleaning fluid. One of ordinary skill in the art will understand that, if the jetting fluid is the same fluid which is normally present in the fluid conduit 54, or which normally flows or is transported through the fluid conduit 54, the same fluid may continue to flow through the fluid conduit 54 whilst cleaning is performed.

Pumping the jetting fluid along the jetting fluid flow path and out of the one or more jetting apertures 84 causes the jetting head 80 to rotate relative to the body 60 resulting in rotating high pressure jets of fluid which strip scale, debris, accumulated matter wax and/or hydrates 50 from the interior of the fluid conduit system 8 on the output side 58 of the cleaning head 47. The combination of the use of such rotating high pressure fluid jets with the very controlled rate of penetration of the composite tubing 18 and the cleaning head 47 into the fluid conduit system 12 may enhance the efficiency with which the scale, debris, accumulated matter wax and/or hydrates 50 are removed from the interior of the fluid conduit system 12. In addition, the high flow rate bypass fluid flow may sweep removed scale, debris, accumulated matter wax and/or hydrates away from the output side 58 of the cleaning head 47 efficiently towards an exit of the fluid conduit 54 thereby reducing the risk of a restriction or a blockage forming in the fluid conduit 54 downstream of the cleaning head 47. If necessary, a filtration system (which may be a simple fluid strainer) may be used to catch debris from the out-flowing fluid. The fluid may be stored in a tank, treated, reinjected or discarded.

The jetting pump 26 may continue to pump jetting fluid 59 through the tubing fluid flow path 100, the jetting fluid flow path and out of the one or more jetting apertures 84 into the fluid conduit 54 on an output side 58 of the cleaning head 47 whilst the bypass fluid 52 is pumped along the annulus 56 through the bypass fluid flow path and the variable aperture valve 90 until the cleaning operation is complete.

It should be understood that the tension in the composite tubing 18 is sensed or monitored at the tubing injector 14 throughout cleaning of the fluid conduit 54 and that various operational parameters may be varied according to the sensed tension including at least one of: a rate of pumping of the bypass fluid along the annulus 56; a pressure of the bypass fluid in the annulus 56; a change in at least one of a type, composition, density and viscosity of the bypass fluid; a rate of pumping of the jetting fluid along the composite tubing 18; a pressure of the jetting fluid in the composite tubing 18; a change in at least one of a type, composition, density and viscosity of the jetting fluid; a rate of injection of the composite tubing 18 into the fluid conduit 54; and a rate of retraction of the composite tubing 18 from the fluid conduit 54. In particular, if the sensed tension in the composite tubing 18 falls below a lower threshold tension, this may indicate that the cleaning head 47 has encountered a restriction or a blockage in the fluid conduit 54 prompting an operator to take remedial action which may include varying any of the above-mentioned operational parameters. Conversely, if the sensed tension in the composite tubing 18 rises above an upper threshold tension, this may indicate that a restriction or a blockage has formed in the bypass fluid flow path of the cleaning head 47 prompting an operator to retrieve the cleaning head 47 from the fluid conduit 54 to allow the restriction or blockage to be removed from the bypass fluid flow path.

Once the cleaning operation is complete, the cleaning head 47 may be retrieved from the fluid conduit system 12 by ceasing pumping of the bypass fluid 52 along the annulus 56 through the bypass fluid flow path and the variable aperture valve 90. Pumping of the jetting fluid 59 may also be ceased. The fluid conduit system 12 is sealed on the output side 58 of the cleaning head 47. The tubing injector 14 then retracts the composite tubing 18 from the fluid conduit system 12 until the cleaning head 47 becomes hydraulically locked within the fluid conduit system 12. Jetting fluid 59, which may or may not be cleaning fluid, is then pumped through the tubing fluid flow path 100, the jetting fluid flow path and out of the one or more jetting apertures 84 into the fluid conduit system 12 on the output side 58 of the cleaning head 47 to provide a thrust on the cleaning head 47 to assist with retrieval of the cleaning head 47 from the fluid conduit system 12. At the same time, water or brine may be pumped into the annulus 56 to aid retrieval of the cleaning head 47 from the fluid conduit system 12.

One of ordinary skill in the art will understand that various other modifications may be made to the cleaning heads and cleaning systems for use in cleaning a fluid conduit for transporting hydrocarbons and/or a fluid conduit in a hydrocarbon wellbore described above without departing from the scope of the present invention as defined by the appended claims. For example, the cleaning head may comprise fewer or more than two flange arrangements. Each flange arrangement may comprise one or more flanges. The body of the cleaning head may comprise an assembly of fewer or more members than described above. The body of the cleaning head may be unitary. The number and/or arrangement of the bypass fluid input ports and/or the number and/or arrangement of the bypass fluid output ports may be different to those described above.

The cleaning method may comprise pumping bypass fluid along the annulus through the bypass fluid flow path and the variable aperture valve to provide a thrust on of the body of the cleaning head of up to 5,000 kg, up to 2,000 kg, up to 1,000 kg or up to 400 kg.

The cleaning method may comprise pumping bypass fluid along the annulus through the bypass fluid flow path and the variable aperture valve to provide a pressure differential across the cleaning head of less than 6.9 bar (approximately 100 psi), of less than 3.5 bar (approximately 50 psi) or of less than 2.1 bar (approximately 30 psi).

The cleaning method may comprise pumping the bypass fluid along the annulus through the bypass fluid flow path and the variable aperture valve at a rate of up to 5,000 litres per minute, at a rate of up to 2,000 litres per minute, at a rate of up to 1,000 litres per minute or at a rate of up to 150 litres per minute.

The cleaning method may comprise pumping the jetting fluid into the tubing at a rate of up to 500 litres per minute, at a rate of up to 200 litres per minute, at a rate of up to 100 litres per minute or at a rate of up to 80 litres per minute.

The cleaning method may comprise varying the pressure at which the jetting fluid is pumped into the tubing according to the length of tubing between a jetting fluid pump and the cleaning head.

The cleaning method may comprise increasing the pressure at which the jetting fluid is pumped into the tubing as the length of tubing between the jetting fluid pump and the cleaning head increases.

The cleaning method may comprise pumping the jetting fluid into the tubing at a pressure of up to 690 bar (approximately 10,000 psi).

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A cleaning head for a cleaning system for use in cleaning a fluid conduit for transporting hydrocarbons and/or a fluid conduit in a hydrocarbon wellbore, the cleaning head comprising:

a body defining an outer surface having a cross-section which is configured to match, or be comparable to, a cross-section of an inner surface of the fluid conduit, wherein the body defines a jetting fluid input port on an input side of the body for connection to tubing, a jetting fluid output port on an output side of the body, and a jetting fluid flow path extending from the jetting fluid input port to the jetting fluid output port, and wherein the body defines a bypass fluid input port on the input side of the body, a bypass fluid output port on the output side of the body, and a bypass fluid flow path extending from the bypass fluid input port to the bypass fluid output port, the bypass fluid flow path being separate from the jetting fluid flow path, wherein the jetting fluid flow path is located radially inwardly of the bypass fluid flow path;

a jetting head defining one or more jetting apertures, wherein the jetting head is coupled to the jetting fluid output port so that the one or more jetting apertures are in fluid flow communication with the jetting fluid flow path; and a variable aperture valve in the bypass fluid flow path, the variable aperture valve defining a variable aperture which varies in response to a variation in fluid flow rate through the bypass fluid flow path.

2. A cleaning head as claimed in claim 1, wherein the variable aperture valve is configured to regulate or reduce any variations in differential pressure between an input fluid pressure acting on an input side of the cleaning head and an output fluid pressure acting on an output side of the cleaning head via adaptation of the cross-sectional area of the variable aperture, which variations in differential pressure arise as a result of any variations in fluid flow rate in the bypass fluid flow path, the adaptation of the cross-sectional area of the variable aperture occurring in response to said variations in fluid flow rate in the bypass fluid flow path.

3. A cleaning head as claimed in claim 1, wherein the variable aperture valve defines a variable aperture having a cross-sectional area which increases in response to an increase in fluid flow rate through the variable aperture and which decreases in response to decrease in fluid flow rate through the variable aperture over a range of fluid flow rates.

4. A cleaning head as claimed in claim 1, wherein the variable aperture valve defines a variable aperture having a cross-sectional area which varies in proportion to the square of the fluid flow rate through the variable aperture over a range of fluid flow rates.

5. A cleaning head as claimed in claim 1, wherein the variable aperture valve comprises a moveable valve member, a valve seat and a bias arrangement, wherein the bias arrangement biases the valve member towards the valve seat and wherein fluid flow through the bypass fluid flow path urges the valve member to move away from the valve seat against the bias of the bias arrangement.

6. A cleaning head as claimed in claim 1, wherein the jetting head is rotatable relative to the body.

7. A cleaning head as claimed in claim 1, wherein the bypass fluid flow path is annular.

8. A cleaning head as claimed in claim 1, wherein the body comprises an inner member, the inner member defining the jetting fluid flow path internally thereof.

9. A cleaning head as claimed in claim 8, wherein the body comprises an outer member arranged around the inner member.

10. A cleaning head as claimed in claim 9, wherein an outer surface of the inner member and an inner surface of the outer member define at least a part of the bypass fluid flow path therebetween.

11. A cleaning system for use in cleaning a fluid conduit for transporting hydrocarbons and/or a fluid conduit in a hydrocarbon wellbore, the cleaning system comprising:

a cleaning head for a cleaning system for use in cleaning a fluid conduit for transporting hydrocarbons and/or a fluid conduit in a hydrocarbon wellbore, the cleaning head comprising:

a body defining an outer surface having a cross-section which is configured to match, or be comparable to, a cross-section of an inner surface of the fluid conduit, wherein the body defines a jetting fluid input port on an input side of the body for connection to tubing, a jetting fluid output port on an output side of the body, and a jetting fluid flow path extending from the jetting fluid input port to the jetting fluid output port, and wherein the body defines a bypass fluid input port on the input side of the body, a bypass fluid output port on the output side of the body, and a bypass fluid flow path extending from the bypass fluid input port to the bypass fluid output port, the bypass fluid flow path being separate from the jetting fluid flow path, wherein the jetting fluid flow path is located radially inwardly of the bypass fluid flow path;

a jetting head defining one or more jetting apertures, wherein the jetting head is coupled to the jetting fluid output port so that the one or more jetting apertures are in fluid flow communication with the jetting fluid flow path; and a variable aperture valve in the bypass fluid flow path, the variable aperture valve defining a variable aperture which varies in response to a variation in fluid flow rate through the bypass fluid flow path;

a jetting fluid pump;

a length of tubing defining a tubing fluid flow path, wherein one end of the tubing is connected to the jetting fluid input port of the cleaning head such that the tubing fluid flow path is in fluid flow communication with the jetting fluid flow path and the other end of the tubing is connected to the jetting fluid pump;

a tubing injector apparatus for injecting the tubing into, and/or retracting the tubing from, the fluid conduit; and a pressure control arrangement for containing pressure within the fluid conduit, wherein the pressure control arrangement is configured to provide a seal with an outer surface of the tubing whilst permitting the tubing to be injected into, and/or retracted from, the fluid conduit.

12. A cleaning system as claimed in claim 11, comprising a tension sensor for sensing tension in the tubing.

13. A cleaning system as claimed in claim 12, wherein the tension sensor is provided with, or as part of, the tubing injector apparatus.

* * * * *